US005283116A

United States Patent [19]

Tomari et al.

[11] Patent Number: 5,283,116

[45] Date of Patent: Feb. 1, 1994

[54] SHEET FEEDING MEMBER HAVING A FILM CONTAINING INORGANIC POWDER

[75] Inventors: Yoshiaki Tomari, Yokosuka; Susumu Kadokura, Sagamihara; Masashi Honma, Toride; Yasunori Atarashi, Ibaraki; Shoichi Shimura, Yokohama, all of Japan

[73] Assignee: Canon Kabushiki Kaisha, Tokyo, Japan

[21] Appl. No.: 685,633

[22] Filed: Apr. 16, 1991

[30] Foreign Application Priority Data

| | | | |
|---|---|---|---|
| Apr. 17, 1990 | [JP] | Japan | 2-99413 |
| Apr. 18, 1990 | [JP] | Japan | 2-100244 |
| Apr. 18, 1990 | [JP] | Japan | 2-100245 |
| Apr. 25, 1990 | [JP] | Japan | 2-107510 |

[51] Int. Cl.[5] .................... B32B 9/00

[52] U.S. Cl. .................... 428/323; 428/208; 428/325; 428/328; 428/403; 428/426; 428/457; 428/401

[58] Field of Search .............. 428/323, 325, 328, 403, 428/472, 461, 457, 426, 208

[56] References Cited

U.S. PATENT DOCUMENTS

| | | | |
|---|---|---|---|
| 4,215,170 | 7/1980 | Olivia | 428/208 |
| 5,082,826 | 1/1992 | Fernando | 428/404 |

FOREIGN PATENT DOCUMENTS

| | | |
|---|---|---|
| 0230633 | 8/1987 | European Pat. Off. . |
| 0401886 | 12/1990 | European Pat. Off. . |
| 59-232297 | 12/1984 | Japan . |
| 60-052594 | 3/1985 | Japan . |
| 2-2020 | 1/1990 | Japan . |

OTHER PUBLICATIONS 2 pgs. European Search Report.

Nikkan Kogyo Shinbun Sha, vol. 30, No. 10, pp. 53–54, "Kogyo Zairo (Industrial Materials)".

*Primary Examiner*—Patrick J. Ryan

*Assistant Examiner*—Abraham Bahta

*Attorney, Agent, or Firm*—Fitzpatrick, Cella, Harper & Scinto

[57] ABSTRACT

A delivery member comprises a substrate and, provided thereon, an electro-deposition coating film containing inorganic powder. The inorganic powder may be selected from the group consisting of a ceramic powder, a metal powder, and a ceramic powder whose particle surfaces are coated with a metal.

8 Claims, 7 Drawing Sheets

SHEET FEEDING MEMBER HAVING A FILM CONTAINING INORGANIC POWDER

BACKGROUND OF THE INVENTION

1. Field of the Invention

The present invention relates to a delivery member. More particularly it relates to a delivery member used in paper delivery members of office automation machinery, home electric apparatus, printers, etc., or at their parts through which film sheets, plastic sheets and other sheet-like mediums or paper are delivered. It also relates to an apparatus making use of such a member.

2. Related Background Art

Delivery members hitherto used, such as roller members used for paper transport in office automation machinery, home electric apparatus, printers, etc. are exemplified by those comprising a steel material whose surface is plated, thereafter covered with rubber and then coated with Teflon (trademark), those comprising a steel material whose surface is plated and then coated with aluminum oxide by electrostatic spraying or subjected to composite plating to form a coating containing SiC or diamond dust, those comprising a steel material whose surface is roughed by sandblasting or using a laser, those in which plating is applied to their surface thus roughened, and those comprising a steel material spray-coated thereon with a coating composition in which metal fine particles or fillers have been mixed.

These delivery members, when used, are further grounded through a voltage regulator so that the resistivity at the part through which paper passes (hereinafter "paper-pass part") can be controlled to be of a middle value.

The conventional delivery members, however, have the following disadvantages.

In the first place, in the case of the delivery member comprising a roller member spray-coated with a coating composition in which metal fine particles or fillers have been mixed, there is a limit in the simultaneous coating of a plurality of members by means of a set of coating robot when a high-grade surface uniformity is required as in the delivery members, even if an automation line is adopted in the manufacturing process. Moreover, the state of surfaces of coatings becomes non-uniform because of diffusion of coating compositions to cause a big problem in both the mass productivity and the surface properties.

The delivery member comprising a roll member comprised of a steel material whose surface is plated. thereafter covered with rubber and then coated with Teflon, has the problem that changes with time as a result of repeated use bring about a deformation of rubber to lower outside diameter precision and cause faulty paper feed and output. This not only lowers its commercial value but also requires a prolonged process in its manufacture, lowers operating efficiency, and results in a high production cost. Thus, there is a great problem in its mass productivity.

As for the delivery member comprising a roller member whose surface, e.g., stainless steel surface has been sandblasted to increase a coefficient of surface friction, the member has the problem that its material is so high in hardness that it is difficult to enhance work precision, also resulting in an increase in both the material cost and the manufacturing cost.

Similarly, the delivery member comprising a steel material whose surface is roughed by sandblasting tends to rust on irs surface and hence requires a treatment for rust prevention, e.g., plating, carried out in a subsequent step for the purpose of protection from corrosion. In such an instance, the plating is carried out on the sandblasted surface, having a low outside diameter precision, so that the outside diameter precision is further lowered and also the number of manufacturing steps increases. Thus this member can not be mass-produced.

In the case of the delivery member comprising a steel material whose surface is roughed using a laser to increase a coefficient of friction, only one member can be manufactured at one time when it is a roller or the like, and moreover it takes a long time for that treatment. Thus this member also can not be mass-produced.

The delivery member comprising a steel material whose surface is plated and then coated with aluminum oxide by electrostatic spraying to increase the wear resistance or hardness of its surface can not be stable in the adhesion and uniformity of aluminum oxide and the final outside diameter precision. There is also a limit in the manufacture of uniform-quality goods in large quantities and at a low cost.

Besides, the delivery member comprising a metallic member whose surface is subjected to electroless plating and then, in a subsequent step, subjected to composite plating to form a coating containing SiC or diamond dust has the problem that, for example, impurities tend to be included in a composite plating bath to make the bath unstable and hence the bath can not be durable to repeated use. Moreover, there are a disadvantage of high cost in plating solutions and a problem of a poor uniform dispersibility, bringing about a big problem in manufacturing cost.

In many instances, it is an important factor to impart conductivity to the delivery member. For example, conductive paper delivery members are used in copying machines or the like at their many paper-pass parts, and resistivity is controlled at the paper-pass parts.

Namely, in the case when a paper delivery member at a paper-pass part that comes into contact with paper has insulation properties, the paper delivery member produces triboelectricity due to friction between paper and the member in an environment of low humidity, so that toner may adhere to the paper delivery member to produce a stain on the paper. In the case when a paper delivery member at a paper-pass part has a low resistivity, the paper itself comes to serve as a low-resistive element in an environment of high humidity because of its moisture absorption, so that the charges produced may leak through a transfer guide to cause blank areas of images.

FIG. 5 is a diagrammatic illustration of the part at which the transfer guide is used in a copying machine. In conventional copying machines, as shown in the drawing, a transfer guide 14 or fixing inlet guide comprised of a Ni-coated steel material is grounded through a voltage regulator (a varistor) to have a middle voltage so that toner stains and blank areas caused by poor transfer can be prevented. This method, however, requires an increase in the number of component parts to bring about an increase in operational steps, and hence can not be mass-productive. In the drawing, the numeral 9 denotes a photosensitive member; 10, toner; 11, a transfer medium; and 13, a transfer charger.

SUMMARY OF THE INVENTION

The present invention was made in order to solve these problems involved in the prior art. An object of the present invention is to provide a delivery member having superior wear resistance and a good surface uniformity.

Another object of the present invention is to provide a delivery member having superior wear resistance and a good surface uniformity, and also capable of being controlled on its conductivity.

Still another object of the present invention is to provide an apparatus making use of the above delivery member.

The present invention is a delivery member comprising a substrate and, provided thereon, an electro-deposition coating film containing an inorganic powder.

According to the present invention, an electro-deposition coating film is formed by electrophoresis on a delivery member such as a roller member comprised of a metallic member or non-metallic member, using an electro-deposition coating composition comprising a resin feasible for electro-deposition and an inorganic powder contained therein. This makes it possible to provide a delivery member that has a surface layer in which incorporated fine particles are uniformly dispersed, there is less change with time, and which has a superior wear resistance and a good surface uniformity. In an instance where the organic powder is conductive, the present invention can provide, in addition to the above characteristics, a delivery member having a superior controllability on its conductivity.

DESCRIPTION OF THE PREFERRED EMBODIMENTS

Figure 1:
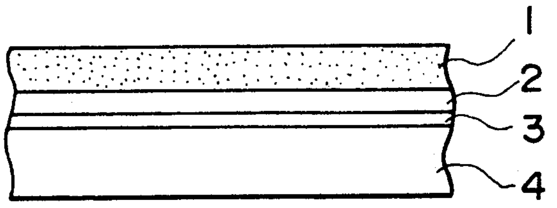
FIGS. 1, 2 and 3 are each a partial cross section to show an example of the constitution of the delivery member according to the present invention
Figure 2:
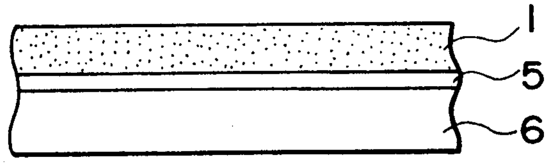
Figure 3:
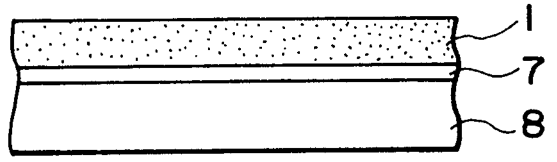

FIGS. 1, 2 and 3 are each a partial cross section to show an example of the constitution of the delivery member according to the present invention. In FIG. 1, the delivery member of the present invention comprises a roller member comprised of a non-metallic member made of ABS resin or the like, on the surface of which a catalytically treated layer 3 and a metal coat layer 2 have been successively formed by a commonly known plating process applied to plastics, and on the base material of which, thus prepared, an electro-deposition coating film 1 is formed.

FIG. 2 is a partial cross section to show another example of the constitution of the delivery member according to the present invention. It comprises a metallic member 6 made of aluminum or the like, on the surface of which an aluminum anodic oxidation coating layer 5 is formed, and on the base material of which, thus prepared, the electro-deposition coating film 1 is formed.

FIG. 3 illustrates a delivery member comprising a metallic member 8 made of a steel material or the like, on the surface of which a chemical conversion coating layer 7 is formed, which is commonly known to be formed for the purpose of protection from corrosion, and on the base material of which, thus prepared, the electro-deposition coating film 1 is formed.

As a substrate used in the delivery member of the present invention, any of metallic members made of aluminum, iron or the like and non-metallic members made of plastic or the like may be used. Depending on the properties thereof, the treatments as shown in relation to FIGS. 1 to 3 or any other conventional treatments are applied as undercoating carried out before electro-deposition coating. There are no particular limitations on the non-metallic members, and it is possible to use any plastic materials used in delivery members of office automation machinery, home electric apparatus, printers, etc., including, for example, ABS, CF/ABS, modified PPE, modified PPO, and GF/PC.

The delivery member of the present invention on which an electro-deposition coating film has been formed can be produced by subjecting the metallic member or nonmetallic member as described above to undercoating carried out before electro-deposition coating, and then carrying out the electro-deposition coating to form the electro-deposition coating film.

A coating composition comprising a resin feasible for electro-deposition and an inorganic powder incorporated therein is used as the electro-deposition coating composition used in the electro-deposition coating. This electro-deposition coating composition can be used as an anionic one or a cationic one.

The inorganic powder may preferably be at least one selected from ceramic powder, metal powder, and ceramic powder whose particle surfaces are coated with a metal (hereinafter "metallized ceramic powder"). The metal powder and the metallized ceramic powder are effective as conductive inorganic powders.

The ceramic powder and the metallized ceramic powder may preferably have a particle diameter of 0.1 μm to 3.0 μm. The metal powder may preferably have a diameter of 0.01 μm to 3.0 μm.

The particle diameter of the inorganic powder is a value measured with a centrifugal sedimentation type particle size distribution measuring device. A device actually used as this measuring device is SACP-3 (manufactured by Shimadzu Corporation).

As the resin feasible for electro-deposition, commonly known low-temperature curable resins can be used, including, for example, acryl-melamine resins, acrylic resins, epoxy resins, urethane resins and alkyd resins.

As the ceramic powder, a vast range of powders can be used without any particular limitations, preferably including SiC, $SiO_2$, $Si_3N_4$, TaC, ZrO, $Al_2O_3$ and NbC.

The ceramic powder should have an average particle diameter usually in the range of from 0.1 μm to 3.0 μm, and preferably from 0.3 μm to 1.5 μm. An average particle diameter less than 0.1 μm and that more than 3.0 μm are not preferable since the former can not give the necessary surface roughness to the delivery member and the latter makes the surface roughness so large that the performance of paper pass may be lowered.

There are no particular limitations on the metal powder incorporated into the resin feasible for electro-deposition. It includes, for example, Ag, Co, Cu, Fe, Mn, Ni, Pd, Sn and Te. As to the particle diameter, the metal powder should have an average particle diameter usually in the range of from 0.01 to 3.0 μm, and preferably from 0.1 to 1.0 μm. An average particle diameter less than 0.01 μm and that more than 3.0 μm are not preferable since the former causes secondary agglomeration when the powder is dispersed in the electro-deposition coating composition and the latter may result in a lowering of the uniform dispersibility of powder to the electro-deposition coating film.

The metal powder may preferably be those produced by, for example, heat plasma evaporation, pulverizing, etc.

The metallized ceramic powder may include a ceramic powder whose particle surfaces are coated with a metal such as Ag, Ni or Cu, and a nickel-coated ceramic powder whose particle surfaces are further plated with Au. From the viewpoint of cost, it is suitable for the metal coating on the ceramic powder particle surfaces to be carried out by electroless plating using nickel or copper.

The ceramic powder should have an average particle diameter usually in the range of from 0.1 μm to 3.0 μm, and preferably from 0.3 μm to 1.5 μm. An average particle diameter less than 0.1 μm and that more than 3.0 μm are not preferable since the former results in an increase in cost for metal coating on ceramic powder and the latter brings about a lowering of uniform dispersibility in the electro-deposition coating film. The metal coating on the particle surfaces of the ceramic powder should be applied in a thickness usually ranging from 0.05 μm to 0.9 μm, and preferably from 0.1 μm to 0.5 μm.

The inorganic powder may be contained in the electro-deposition coating composition in an amount ranging from 5 parts by weight to 50 parts by weight (5 parts by weight to 40 parts by weight in the case of the metal powder), and preferably from 5 parts by weight to 20 parts by weight, based on 100 parts by weight of the resin feasible for electro-deposition. Its addition within this range can give an electro-deposition coating film having a wear resistance uniformly good throughout the coating film. An amount less than 5 parts by weight and an amount more than 50 parts by weight (40 parts by weight in the case of the metal powder) are not preferable since the former may result in an insufficient surface roughness and the latter may result in a lowering of adhesion of the coating film to the base material.

When the conductive inorganic powder is used, the conductivity of the electro deposition coating film can be controlled to have any desired value, by appropriately controlling its content with respect to the resin feasible for electro-deposition.

As the inorganic powder, it is effective to use a mixture of the metal powder and the metallized ceramic powder. In such an instance, they may preferably be mixed in such a proportion that the metallized ceramic powder is in the range of from 30 parts by weight to 300 parts by weight based on 100 parts by weight of the metal powder.

The deposition of the inorganic powder can be confirmed using an X-ray microanalyzer. The content thereof can be measured by thermogravimetric analysis.

The inorganic powder can be dispersed in the electro-deposition coating composition by carrying out dispersion for about 24 hours to about 35 hours using a ball mill, and thereafter diluting the dispersion with desalted water to have a concentration of 10 parts by weight to 15 parts by weight as solid contents in the same manner as in electro-deposition coating commonly used. The electro-deposition coating composition can be thus prepared. The electro-deposition coating can be of an anionic or cationic type.

The electro-deposition should be carried out under conditions of a bath temperature ranging from 20° C. to 25° C., a pH of 8 to 9, an applied voltage of 50 V to 200 V, a current density of 0.5 $A/dm^2$ to 3 $A/dm^2$ and a treatment time of 3 minutes to 5 minutes, where the article to be coated is set as the anode in the anionic electro-deposition coating, and as the cathode in the cationic electro-deposition coating. Subsequently, the coating formed is washed with water, followed by dewatering, and then cured in an oven of 100° C. to 140° C. for 20 minutes to 180 minutes. Thus the formation of the electro-deposition coating film is completed. In the coating film thus formed, the inorganic powder may be deposited in an amount of 5% by weight to 50% by weight, and preferably 20% by weight to 40% by weight.

The electro-deposition coating film should have a coating thickness of not less than 5 μm, and preferably of 7 to 15 μm. The coating controlled in the thickness not less than 5 μm can give an electro-deposition coating film having a wear resistance uniformly good throughout the coating film.

In the present invention, the above inorganic powder is dispersed in the resin and co-deposited in the electro-deposition coating film by the action of electrophoresis, so that coating film properties equal or superior to those of high-temperature cured films can be obtained since the curing reaction can perfectly proceed in spite of the low-temperature curing (100° C.).

Durability tests were carried out on various roller members to obtain the results shown in Tables 1 to 3. The roller members tested were uniformed to have the same outer diameter of 30 mm.

In regard to Tables 1 to 3, the inorganic powders to be deposited in electro-deposition coating films were each dispersed in an amount of 6 to 11 parts by weight (in the case of the metal powder, 7 to 17 parts by weight) based on 100 parts by weight of acrylic resin. Anionic electro-deposition coating compositions were thus prepared. Electro-deposition coating was carried out to give a coating thickness of 10 μm on each roller member. Here, the electro-deposition was carried out at bath temperatures of 20° to 25° C. and the curing was carried out for 60 minutes in an oven at a curing temperature of 100° C.

Figure 4:
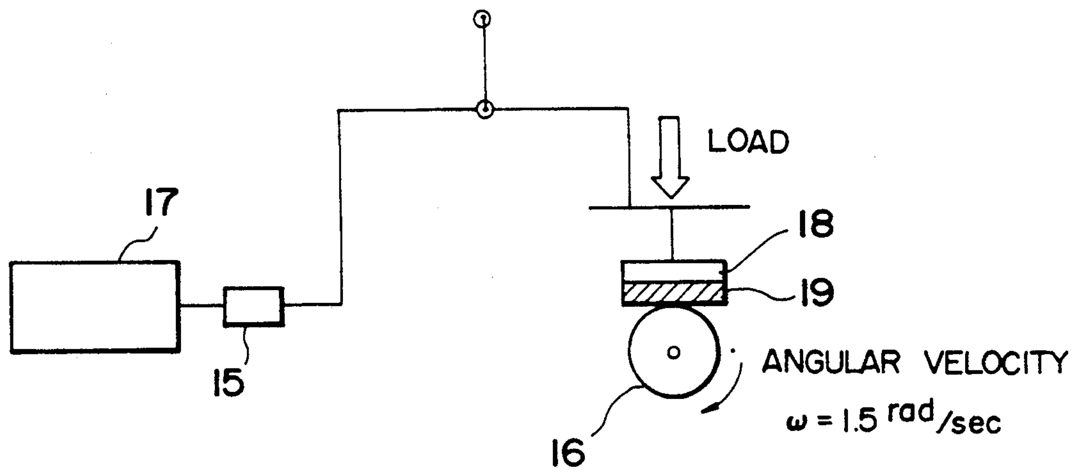
FIG. 4 is a diagrammatic illustration of a surface properties testing device used in the measurement of the wear resistance of delivery members.

FIG. 4 is a diagrammatic illustration of a surface properties testing device used to evaluate the wear resistance of roller members in the durability tests. Using this test device, coefficients of static friction at the roller members were measured before and after the durability tests to evaluate the wear resistance.

The durability tests on the roller members were each carried out using the same kind of two roller members, which were fitted to a copying machine, where running to pass 150,000 sheets of copying plain paper was carried out.

The coefficients of static friction of roller members before and after the durability tests were measured in the following way: In the device shown in FIG. 4, copy paper 19 (A4 size) was secured to the back of a copy paper securing plate 18 with flat surface, which was then brought into contact with a roller member 1 of 30 mm in outer diameter and 230 mm in length, where a maximum load of 1 to 2 kg was applied from the top and the roller member was rotated in the direction of an arrow at an angular velocity $\omega$ of 1.5 rad/sec to measure a coefficient of static friction.

When the roller member is made of rubber, judgement was made only on whether any faulty paper pass occurred during the running test.

Results obtained are shown in Tables 1 to 3.

TABLE 1

| Inorganic powder to be deposited in electro-deposition coating film | Inorganic powder average particle diameter (μ) | Coefficient of static friction before running | Coefficient of static friction after running | Delivery performance after running |
|---|---|---|---|---|
| SiC | 1.0 | 2.0 | 1.7 | Good |
| $Si_3N_4$ | 1.0 | 2.1 | 1.6 | Good |
| TaC | 1.0 | 2.0 | 1.5 | Good |
| $Al_2O_3$ | 1.0 | 2.0 | 1.5 | Good |
| $Al_2O_3$(Ni)* | 1.0 | 1.9 | 1.5 | Good |
| $Al_2O_3$(Cu)** | 1.0 | 2.0 | 1.5 | Good |
| $SiO_2$ | 1.0 | 1.9 | 1.5 | Good |
| $SiO_2$(Ni)*** | 1.0 | 2.0 | 1.6 | Good |
| $Cr_2O_3$ | 1.0 | 1.9 | 1.5 | Good |
| Stainless steel member sandblasted | | 2.0 | 1.5 | Good |
| Steel material sandblasted and then Ni-coated by electroless plating | | 1.9 | 0.7 | Poor |
| Steel sheet plated, covered with rubber and then coated with Teflon | | Not measured | Not measured | Faulty delivery upon 100,000 sheets running |

TABLE 2

| Inorganic powder to be deposited in electro-deposition coating film | Inorganic powder average particle diameter (μ) | Coefficient of static friction before running | Coefficient of static friction after running | Delivery performance after running |
|---|---|---|---|---|
| Te | 0.3 | 1.9 | 1.6 | Good |
| Co | 0.3 | 2.0 | 1.6 | Good |
| Ni | 0.3 | 1.8 | 1.5 | Good |
| Mo | 0.3 | 1.8 | 1.5 | Good |
| Ti | 0.3 | 1.9 | 1.5 | Good |
| W | 0.3 | 2.0 | 1.5 | Good |
| Diamond | 0.3 | 2.0 | 1.5 | Good |
| Zr | 0.3 | 2.0 | 1.4 | Good |

TABLE 3

| Inorganic powder to be deposited in electro-deposition coating film | Inorganic powder average particle diameter (μ) | Coefficient of static friction before running | Coefficient of static friction after running | Delivery performance after running |
|---|---|---|---|---|
| $Al_2O_3$(Ni)* + W | 1.0 + 0.3 | 2.0 | 1.6 | Good |
| $Al_2O_3$(Ni)* + Co | 1.0 + 0.3 | 2.1 | 1.6 | Good |
| $Al_2O_3$(Ni)* + Ti | 1.0 + 0.3 | 2.0 | 1.5 | Good |
| $Al_2O_3$(Ni)* + Mo | 1.0 + 0.3 | 2.0 | 1.5 | Good |
| $Al_2O_3$(Ni)* + Te | 1 0 + 0.3 | 2.0 | 1.5 | Good |

TABLE 3-continued

| Inorganic powder to be deposited in electro-deposition coating film | Inorganic powder average particle diameter (μ) | Coefficient of static friction before running | Coefficient of static friction after running | Delivery performance after running |
|---|---|---|---|---|
| $Al_2O_3$(Ni)* + Ni | 1.0 + 0.3 | 2.0 | 1.5 | Good |
| $Al_2O_3$(Cu)** + W | 1.0 + 0.3 | 1.9 | 1.4 | Good |
| $Al_2O_3$(Cu)** + Co | 1.0 + 0.3 | 1.9 | 1.4 | Good |

In Tables 1 to 3;

(1) the data of durability tests are based on 150,000 sheet running tests;

(2) the asterisk * indicates that particle surfaces of $A_2O_3$ were coated with nickel by electroless plating in a coating thickness of 0.1 μm;

(3) the asterisks ** indicates that particle surfaces of $A_2O_3$ were coated with copper by electroless plating in a coating thickness of 0.1 μm;

(4) the asterisks *** indicates that particle surfaces of $SiO_2$ were coated with nickel by electroless plating in a coating thickness of 0.1 μm; and (5) the faulty paper delivery occurred on those with a static friction coefficient of 1.2 or less, measured with the surface properties testing device.

From the results shown in Table 1 to 3, the wear resistance of the paper delivery roller members with the deposits of inorganic powders was found to be equal or superior to that of the roller member comprising a sandblasted stainless steel member.

No changes were seen wherever the base roller member is comprised of a steel material, an aluminum material or an ABS resin material.

Figure 6:
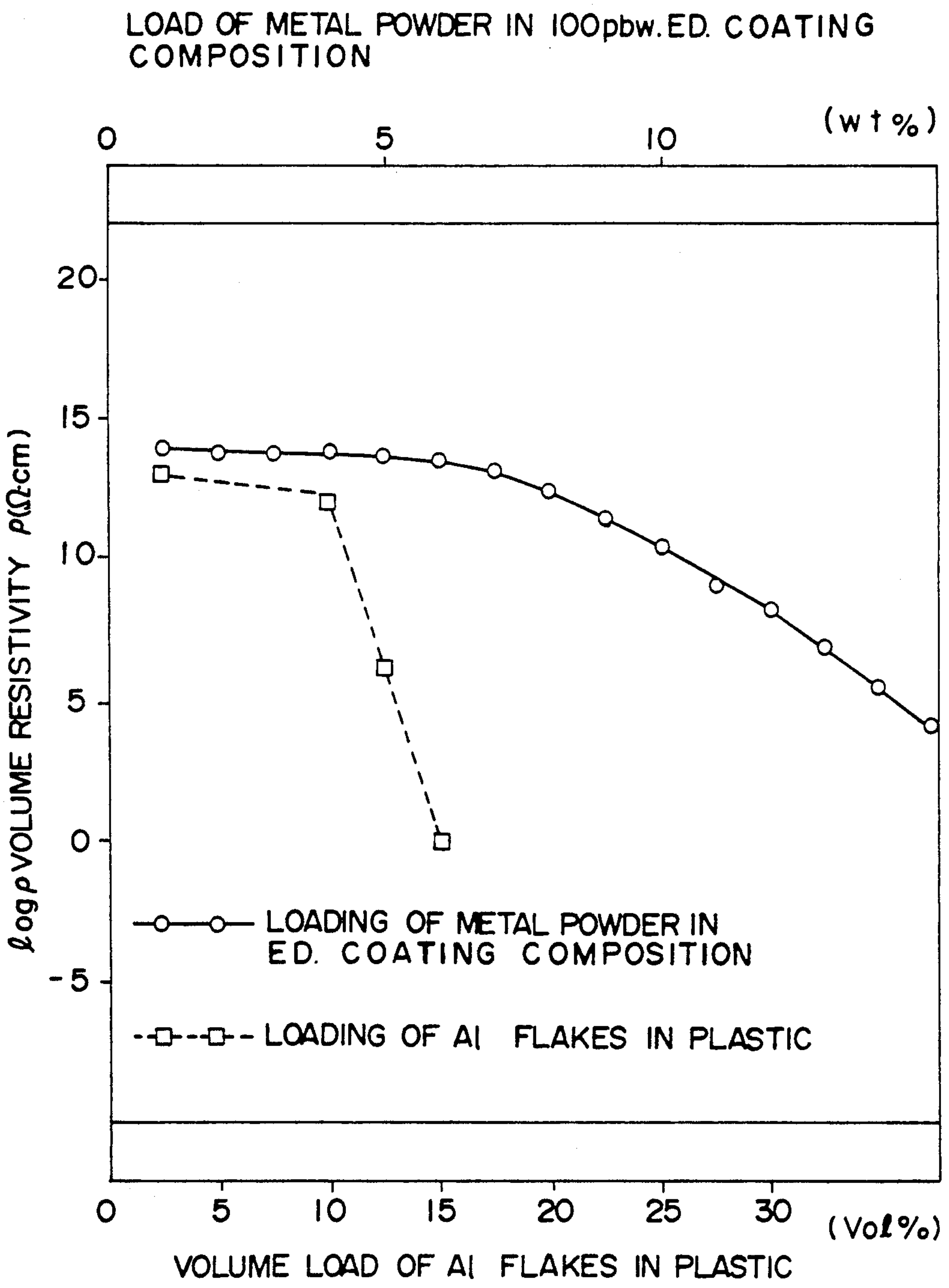
FIGS. 6, 7 and 8 are each a graph to show values measured on the volume resistivities of a flat plate provided with an electro-deposition coating film and a plastic loaded with aluminum flakes.
Figure 7:
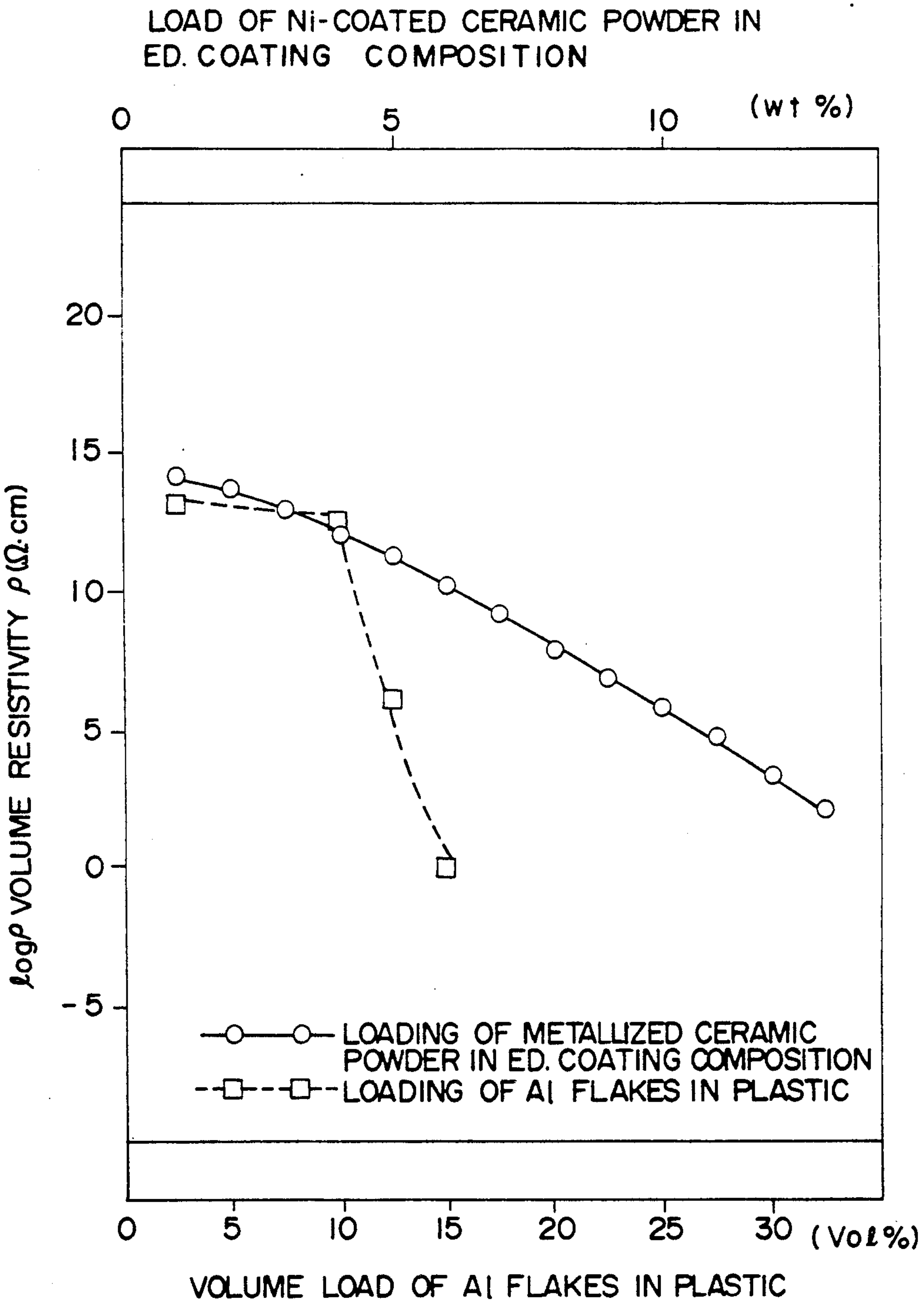
Figure 8:
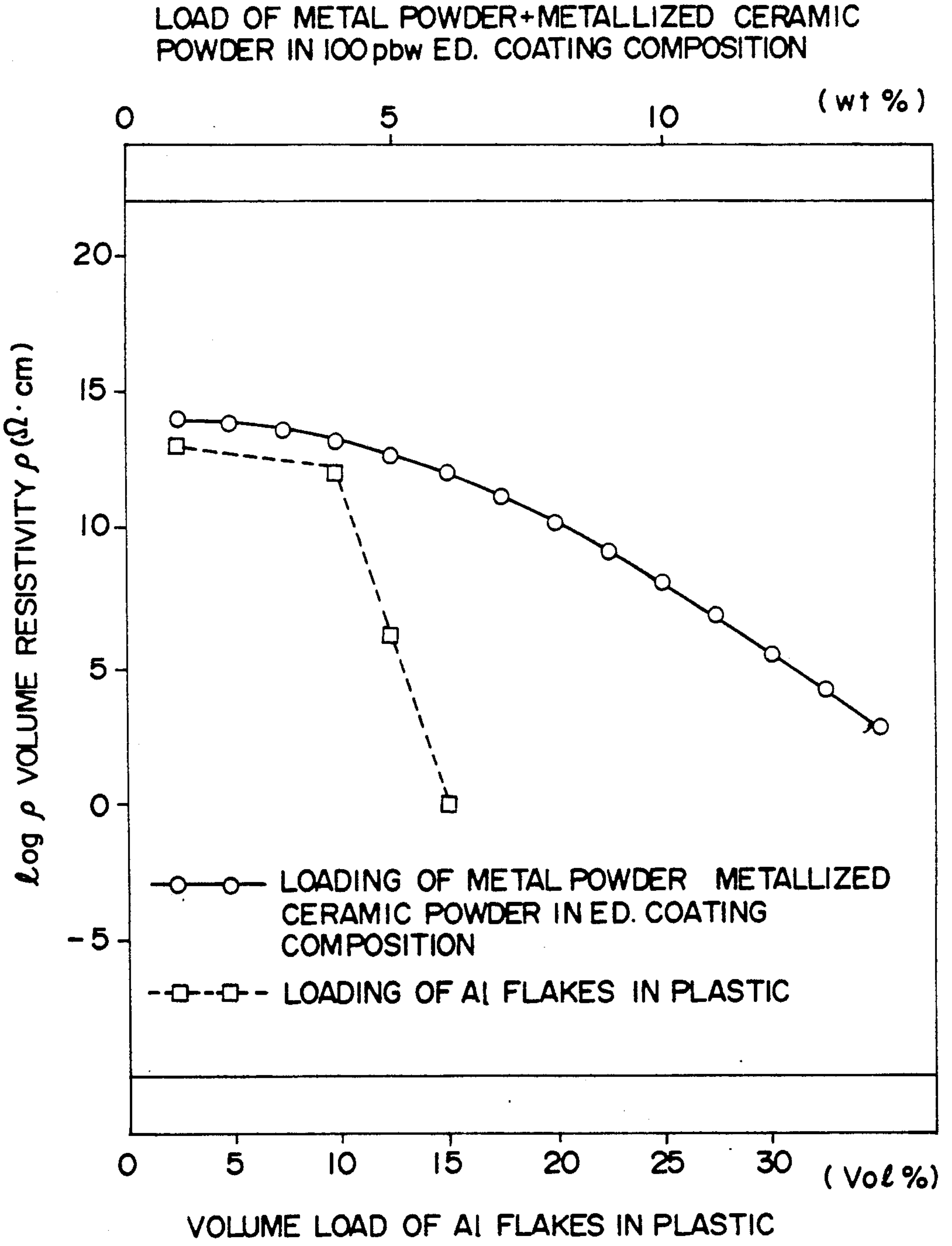

FIGS. 6 to 8 are graphs to show the results obtained when the volume resistivities were measured using a contact type insulation resistance meter, on electro-deposition coating films of 20 μm in coating thickness, formed on one side of aluminum 53S test pieces (size: 5 cm×5 cm, t=1.0 mm) by the use of electro-deposition ("ED." in the drawings) coating compositions comprising an acrylic resin and varied conductive inorganic powders. The resistivities were measured by bringing a four-point probe into contact with the electro-deposition coating film at a measurement area of 1 $cm^2$.

FIGS. 6 to 8 also show the results obtained when the volume resistivities were measured on conductive plastics formed by mixing aluminum flakes (size: 1.0 mm×1.4 mm, 25 to 30 μm thick) into a plastic such as ABS, CF/ABS, modified PPE, modified PPO or GF/PC. Here, the volume resistivities of the kneaded products of aluminum with plastics were measured by the method described in "KOGYO ZAIRYO Industrial Materials)", Nikkan Kogyo Shinbun Sha, Vol. 30, No. 10, p.54.

In the case of the plastics into which aluminum flakes are kneaded, an abrupt decrease in volume resistivity is seen within the range of from 0 to $10^{10}$ Ω·cm with an increase in the load of aluminum flakes. On the other hand, the electro-deposition coating films formed by mixing conductive inorganic powders into electro-deposition coating compositions show volume resistivities with mild changes, and hence it is possible to produce in a good precision, delivery members having any desired specific resistivities.

Moreover, since the deposition coating is carried out by electrophoresis, no localized dispersion of additive fillers occurs, which may occur in the case of kneading, so that it is possible to obtain a coating film that is uniform over the whole surface of the delivery member.

The electro-deposition coating composition used in the case of FIG. 6 is comprised of 13% by weight of acrylic resin to which a nickel powder with an average particle diameter of 0.3 μm has been added. The electro-deposition coating composition used in the case of FIG. 7 is comprised of 12% by weight of acrylic resin to which a ceramic powder with an average particle diameter of 1 μm whose particle surfaces are coated with nickel in a thickness of 0.1 μm has been added. The electro-deposition coating composition used in the case of FIG. 8 is comprised of 12% by weight of acrylic resin to which a mixture of a nickel powder with an average particle diameter of 0.3 μm and a ceramic fine powder ($Al_2O_3$) with an average particle diameter of 1 μm whose particle surfaces are coated with nickel in a thickness of 0.1 μm (mixing proportion: 7:1) has been added.

Figure 5:
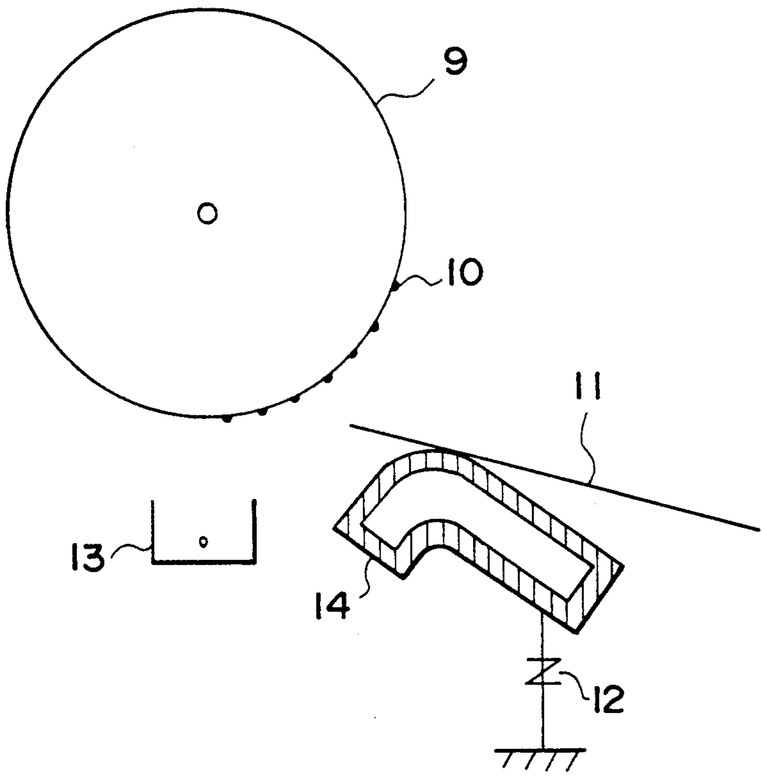
FIG. 5 is a diagrammatic illustration of the part at which a transfer guide is used in a copying machine.

It is preferred to use the delivery member of the present invention in the transfer guide, which is a delivery member in the copying machine shown in FIG. 5, since it is possible to obtain the same effect as in the case when the resistivity of the member is controlled using a voltage regulator.

As described above, in the delivery member of the present invention, the deposition of the conductive inorganic powder by electro-deposition coating brings about enlarged contact areas of the powder and an increase in density thereof, and hence makes it possible to Obtain a coating film that is uniform over the whole surface in both a macroscopic view and a microscopic view. Thus, the present invention can solve the problems involved in delivery members required to have a particularly highly precise surface uniformity and at the same time required to have wear resistance and conductivity. Moreover, the present invention greatly contributes not only to improvement in characteristics but also to cost reduction.

In addition, compared with an instance in which a delivery member is formed by molding using a kneaded product prepared by mixing a conductive filler into rubber and plastic, use of the delivery member of the present invention makes it possible to obtain a better wear resistance and any desired conductivity even though any conductive filler is used in an extremely small quantity. Thus the present invention also have a superior economical effect.

Use examples of the delivery member according to the present invention will be described below with reference to FIGS. 9, 10 and 11.

Figure 9:
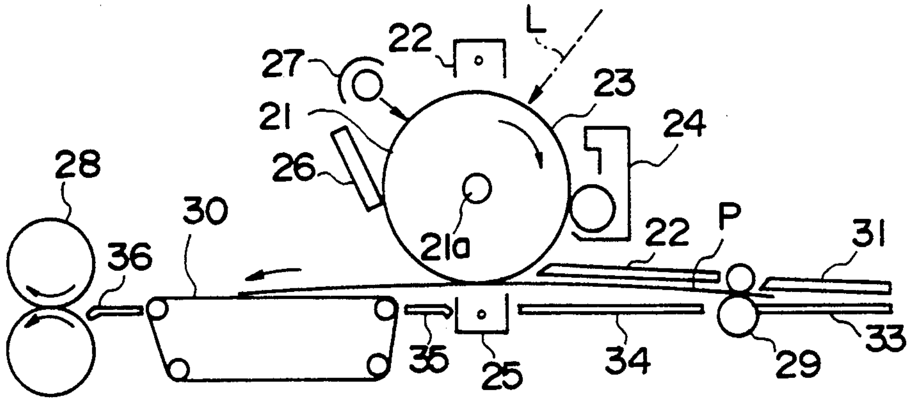
FIG. 9 is a schematic illustration of the constitution of a transfer electrophotographic apparatus in which the delivery member of the present invention is used.

FIG. 9 schematically illustrates the constitution of a commonly available transfer electrophotographic apparatus in which a drum photosensitive member is used.

In FIG. 9, the numeral 21 denotes a drum photosensitive member serving as an image supporting member, which is rotated around a shaft 21*a* at a given peripheral speed in the direction shown by an arrow. In the course of rotation, the photosensitive member 21 is uniformly charged on its periphery, with positive or negative given potential by the operation of a charging means 22, and then photoimagewise exposed to light L (slit exposure, laser beam scanning exposure, etc.) at an exposure zone 23 by the operation of an imagewise exposure means (not shown). As a result, electrostatic latent images corresponding to the exposure images are successively formed on the periphery of the photosensitive member.

The electrostatic latent images thus formed are subsequently developed by toner by the operation of a developing means 24. The resulting toner-developed images are then successively transferred by the operation of a transfer means 25, to the surface of a transfer medium P fed from a paper feed section (not shown) to the part between the photosensitive member 21 and the transfer means 25 in the manner synchronized with the rotation of the photosensitive member 21.

The transfer medium P on which the images have been transferred is separated from the surface of the photosensitive member and led through an image-fixing means 28, where the images are fixed and then delivered to the outside as a transcript (a copy).

The surface of the photosensitive member 21 after the transfer of images is brought to removal of the toner remaining after the transfer, using a cleaning means 26. Thus the photosensitive member is cleaned on its surface, further subjected to charge elimination by a pre-exposure means 27, and then repeatedly used for the formation of images.

The transfer medium P such as transfer paper or transfer film is delivered by means of delivery guides 31, 32, 33, 34, 35 and 36, a pair of resist delivery rollers 29 and a delivery belt 30. The delivery member of the present invention can be effectively applied to such delivery guides, delivery rollers and delivery belt.

The charging means 22 for giving uniform charge on the photosensitive member 21 include corona chargers, which are commonly put into wide use. As the transfer means 25, corona transfer units are also commonly put into wide use.

The electrophotographic apparatus may posess a single divice unit constituted of plural constituents such as the above photosensitive member, developing means and cleaning means so that the unit can be freely removed from the body of the apparatus. For example, the photosensitive member 21 and at least one of the charging means, developing means and cleaning means may be joined into a single device unit so that the unit can be freely mounted or detached using a guide means such as a rail (s) provided in the body of the apparatus. Here, the above device unit may be constituted of the charging means and/or the developing means.

In the case when the electrophotographic apparatus is used as a copying machine or a printer, the exposure of the photosensitive member is carried out with the optical image exposing light L by directing the light reflected from, or transmitted through an original, scanning a laser beam, or driving an LED array or a liquid crystal shutter array according to signals obtained by reading an original with a sensor and converting the information into signals.

When used as a printer of a facsimile machine, the optical image exposing light L serves as exposing light used for the printing of received data. FIG. 10 illustrates an example thereof in the form of a block diagram.

Figure 10:
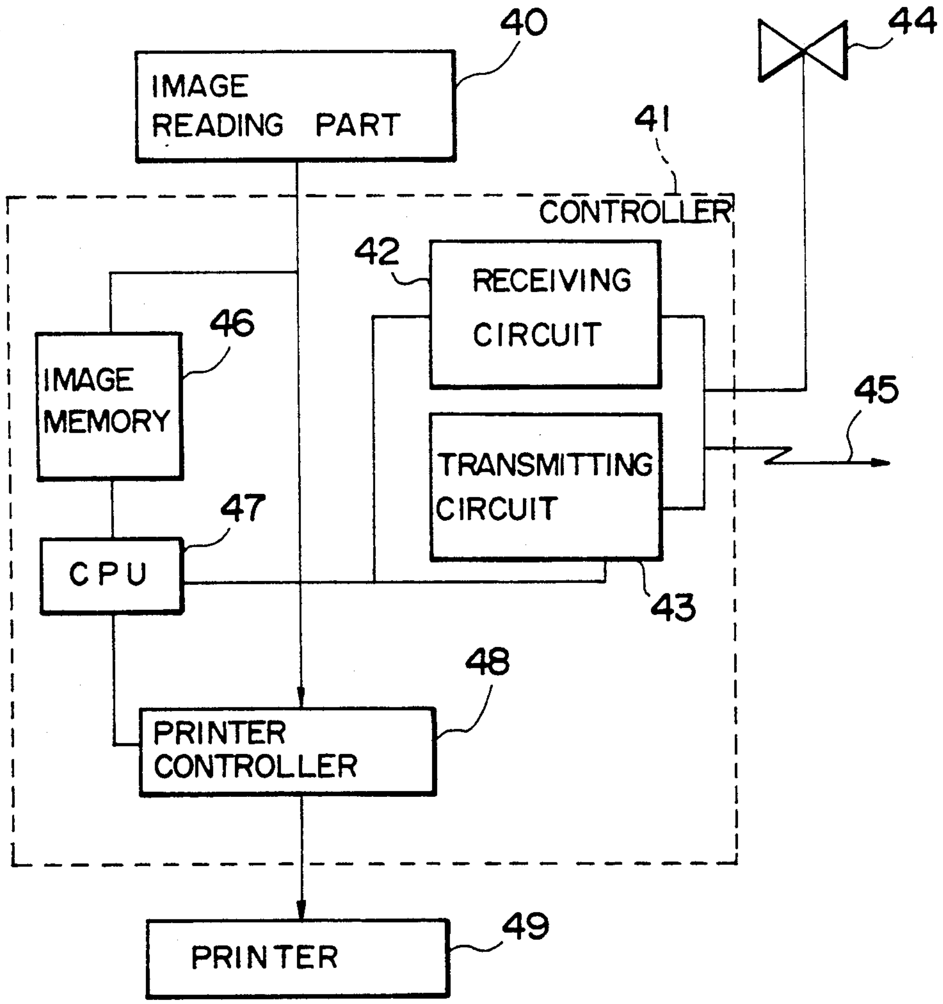
FIG. 10 is a block diagram of a facsimile system in which the above electrophotographic apparatus is used.

As shown in FIG. 10, a controller 41 controls an image reading part 40 and a printer 49. The whole of the controller 41 is controlled by CPU 47. Image data outputted from the image reading part is sent to the other facsimile station through a transmitting circuit 43. Data received from the other station is sent to a printer 49 through a receiving circuit 42. Given image data are stored in an image memory 46. A printer controller 48 controls the printer 49. The numeral 44 denotes a telephone.

An image received from a circuit 45 (image information from a remote terminal connected through the circuit) is demodulated in the receiving circuit 42, and then successively stored in an image memory 46 after the image information is decoded by the CPU 47. Then, when images for at least one page have been stored in the memory 46, the image recording for that page is carried out. The CPU 47 reads out the image information for one page from the memory 46 and sends the coded image information for one page to the printer controller 48. The printer controller 48, having received the image information for one page from the CPU 47, controls the printer 49 so that the image information for one page is recorded.

The CPU 47 receives image information for next page in the course of the recording by the printer 49.

Images are received and recorded in the above way.

Figure 11:
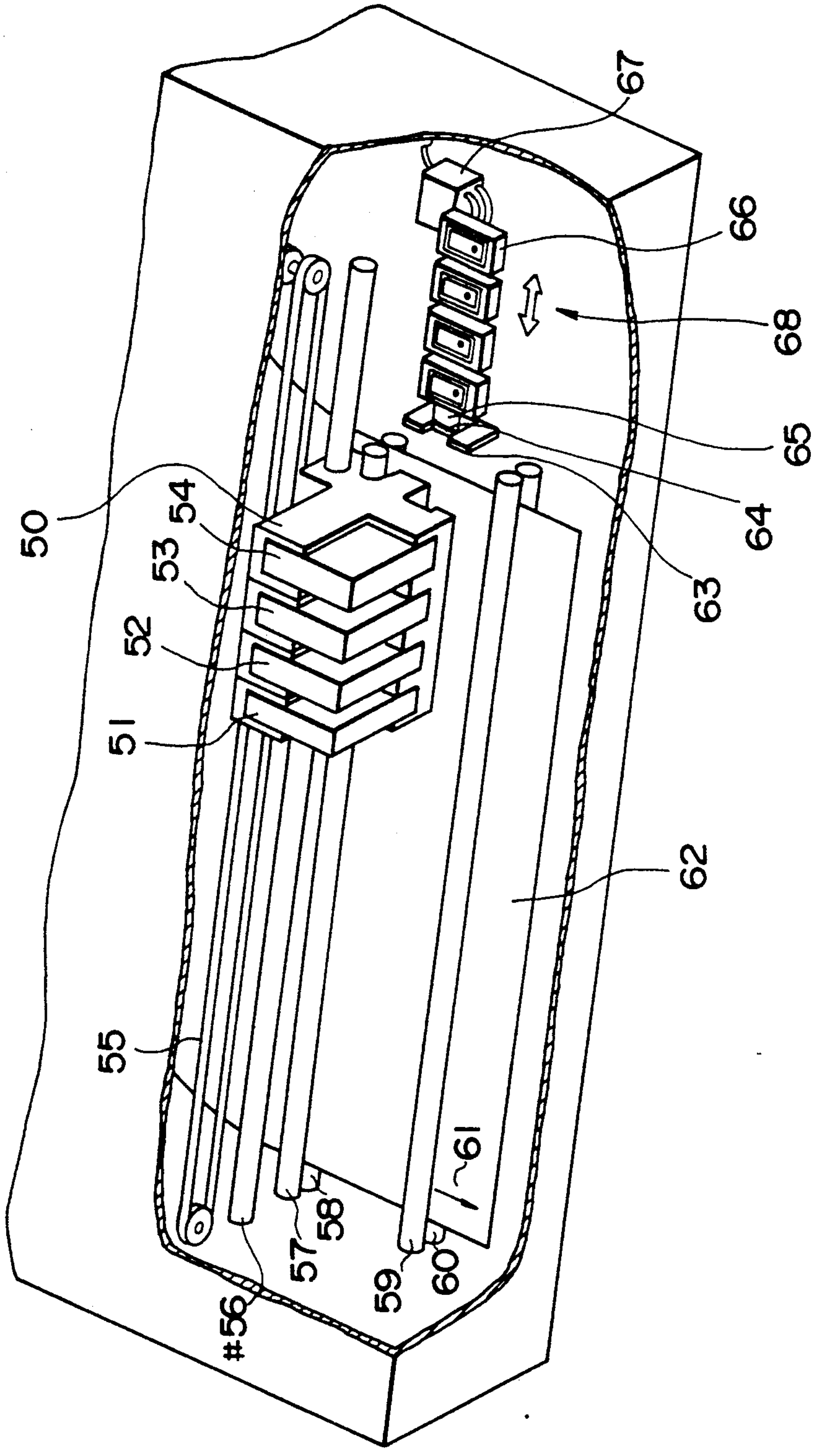
FIG. 11 is a schematic illustration of an ink-jet recording apparatus in which the delivery member according to the present invention is used.

FIG. 11 illustrates an ink-jet recording apparatus in which the delivery member of the present invention is used.

In FIG. 11, the numeral 56 denotes a scanning rail that extends in the main scanning direction of a carriage 50 and slidably supports the carriage 50; and 55, a belt that transmit a driving force for reciprocating the carriage 50. The numerals 59, 60 and numerals 57, 58 are pairs of rollers that constitute a mechanism for delivering a recording medium, which are disposed in front and in the rear, respectively, of the recording position at which ink is ejected from a recording head assembly, and between and through which the recording medium is held and delivered. The delivery member of the present invention can be effectively applied to such rollers.

The carriage 50 is fitted with a plurality of cartridges 51, 52, 53 and 54. Each cartridge is integrally constituted of a ink container and an ink-ejecting recording head assembly. The recording head assembly faces the recording medium being delivered in the direction of an arrow 61. The cartridges 51, 52, 53 and 54 eject inks of, for example, cyan, magenta, yellow and black colors, respectively.

In a restoration assembly 68, the numeral 64 denotes a blade serving as a wiping member; and 65, a blade cleaner formed of, for example, an absorber, used for complete cleaning of the blade 64. In the present example, the blade 64 is retained by a blade elevating mechanism that is driven in accordance with the movement of the carriage 50. Thus the blade 64 can be set in the position where it projects (upward movement) so as to perform cleaning by wiping the face that forms ejection openings of the recording head assembly, or set in the position where it recedes (downward movement) so as not to interfere with that position. In the present example, its mechanism is so designed that the blade 64 performs the wipe-cleaning when the carriage 50 moves from the right side to the left side, viewed in the drawing. If any part of the face that forms ejection openings of the head assembly remains not wiped by the blade 64, an auxiliary blade 63 may be provided at the position where it can be wiped.

In the restoration assembly, the numeral 67 denotes a pump assembly associated with a cap assembly 66, which is used to produce a negative pressure utilized when the cap assembly 66 is brought into contact with the face of ejection openings to carry out suction and so forth.

EXAMPLE 1-1

An ABS resin was formed into a roller member of 30 mm in outer diameter and 230 mm in length to give an article to be coated. This ABS resin roller member was treated with an etchant of a $CrO_3$—$H_2SO_4$—$H_2O$ system for 1 minute. Thereafter, the resulting member was treated at room temperature for 2 minutes using as a sensitizer solution a solution comprised of 30 g/lit. of stannous chloride and 20 ml/lit. of hydrochloric acid, followed by catalytic treatment with palladium. Thereafter, nickel was applied by electroless plating in a thickness of 0.5 μm, followed by treatment with a solution of 0.01 g/lit. of chromic anhydride for 1 minute to give a test member.

In 100 parts by weight of an acryl-melamine resin (trade name: Honey Bright C-IL; produced by Honey Chemical Co.), 10 to 15 parts by weight of fine aluminum oxide powder with an average particle diameter of 1 μm was dispersed for 30 hours using a ball mill, for each increase by 5 parts by weight, and then the dispersion was diluted with desalted water to 15% by weight as a concentration of solid contents to make up a coating composition.

Using this coating composition, electro-deposition was carried out for 3 minutes at applied voltages increasing at intervals of 50 V within the range of from 50 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 97° C.±1° C. for 60 minutes to effect curing. An electro-deposition coated member was thus completed. The electro-deposition coating film formed thereon had a coating thicknesses of 10 to 12 μm and the inorganic powder was contained in the coating film in a deposition quantity of 20 to 25% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 2.0.

EXAMPLE 1-2

A free-cutting leaded steel SLSUM was worked into a roller member of 30 mm in outer diameter and 230 mm in length to give an article to be coated. This roller member was degreased at 60° C. for 5 minutes using a commonly known alkali type degreaser. Next, after thorough washing with water, an iron-phosphate chemical conversion coating was formed in a thickness of 3 μm, followed by thorough washing with pure water and then dewatering and drying to give a test member.

In 100 parts by weight of an acryl-melamine resin (trade name: Honey Bright C-IL; produced by Honey Chemical Co.), 10 to 15 parts by weight of fine aluminum oxide powder with an average particle diameter of 1 μm was dispersed for 30 hours using a ball mill, for each increase by 5 parts by weight, and then the dispersion was diluted with desalted water to 15% by weight as a concentration of solid contents to make up a coating composition.

Using this coating composition, electro-deposition were carried out for 3 minutes at applied voltages increasing at intervals of 50 V within the range of from 50

V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 8 to 12 μm and the inorganic powder was contained in the coating film in a deposition quantity of 18 to 25% by weight.

The wear resistance of the electro-deposition coating film thus formed was tested to obtain a good result that the coefficient of static friction of the roller was 1.5 to 1.7 even after a durability test to pass 150,000 sheets of copying plain paper. In the meantime, the coefficient of static friction before the durability test was 1.9 to 2.0.

EXAMPLE 1-3

An aluminum 53S was worked into a roller member of 30 mm in outer diameter and 230 mm in length to give an article to be coated. On this aluminum roller member, an anodic oxidation coating of 3 μm thickness was formed by anodizing to give a test member.

In 100 parts by weight of an acryl-melamine resin (trade name: Honey Bright C-IL; produced by Honey Chemical Co.), 10 to 15 parts by weight of fine aluminum oxide powder with an average particle diameter of 1 μm was dispersed for 30 hours using a ball mill, for each increase by 5 parts by weight, and then the dispersion was diluted with desalted water to 15% by weight as a concentration of solid contents to make up a coating composition.

Using this coating composition, electro-deposition was carried out for 3 minutes at applied voltages increasing at intervals of 50 V within the range of from 50 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 8 to 12 μm and the inorganic powder was contained in the coating film in a deposition quantity of 16 to 25% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 1.8 to 2.0.

EXAMPLE 2-1

A paper delivery member was produced in the same manner as in Example 1-1 except that 15 parts by weight of cobalt (Co) powder with an average particle diameter of 0.3 μm was used as the inorganic powder, the dispersion was carried out for 30 minutes using a ball mill, and the electro-deposition coating was carried out at applied voltages ranging from 100 V to 150 V.

The wear resistance of the electro-deposition coating film thus formed was tested to obtain a good result that the coefficient of static friction of the roller was 1.4 to 1.7 even after a durability test to pass 150,000 sheets of copying plain paper. In the meantime, the coefficient of static friction before the durability test was 2.0 to 2.1.

EXAMPLE 2-2

On a transfer guide prepared by molding an ABS resin, electro-deposition coating was applied by the same method as in Example 2-1. Here, the electro-deposition coating film was formed using an electro-deposition coating composition prepared by dispersing in 100 parts by weight of an acryl-melamine resin (trade name: Honey Bright C-IL; produced by Honey Chemical Co.) 11 to 13 parts by weight of fine nickel powder with an average particle diameter of 0.3 μm. The electro-deposition coating film thus formed had a coating thicknesses of 10 to 12 μm and the inorganic powder was contained in the coating film in a deposition quantity of 30 to 35% by weight.

The transfer guide having the electro-deposition coating film thus formed had a volume resistivity of $10^7$ to $10^9$ Ω·cm, and no paper contamination due to adhesion of toner occurred even when the transfer guide was set in a copying machine and copying was repeated 10,000 ties in an environment of a low humidity (25% RH). No faulty operation such as blank areas in images also occurred even in an environment of a high humidity (85% RH). Thus the transfer guide showed a good performance as a paper delivery member.

This performance did not change throughout a durability test carried out by 150,000 sheet plain paper copying.

As for the coefficient of static friction, which is a value of physical properties that shows changes in wear resistance, a value as good as 1.4 to 1.5 was obtained after the durability test. In the meantime, the coefficient of static friction before the durability test was 1.8 to 1.9.

EXAMPLE 2-3

A test member was prepared in the same manner as in Example 1-2.

In 100 parts by weight of an acryl-melamine resin (trade name: Honey Bright C-IL: produced by Honey Chemical Co.), 12 parts by weight of tungsten (W) powder with an average particle diameter of 0.3 μm was dispersed for 30 hours using a ball mill, and then the dispersion was diluted with desalted water to 15% by weight as a concentration of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless plate sheet as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 11 to 13 μm and the inorganic powder was contained in the coating film in a deposition quantity of 26 to 32% by weight.

The wear resistance of the electro-deposition coating film thus formed was tested to obtain a good result that the coefficient of static friction of the roller was 1.7 to 1.8 even after a durability test to pass 150,000 sheets of copying plain paper. In the meantime, the coefficient of static friction before the durability test was 2.0.

EXAMPLE 2-4

A test member was prepared in the same manner as in Example 1-3.

In 100 parts by weight of an acryl-melamine resin (trade name: Honey Bright C-IL; produced by Honey Chemical Co.), 15 parts by weight of molybdenum (Mo) powder with an average particle diameter of 0.3 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 10 to 12 μm and the inorganic powder was contained in the coating film in a deposition quantity of 31 to 36% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 1.8 to 1.9.

EXAMPLE 2-5

An Spcc-D material (a steel sheet of t=0.5 mm) was worked into a transfer guide and a fixing inlet guide, which were used as articles to be coated. A pretreatment before electro-deposition coating was carried out in the same manner as in Example 2-3.

In 100 parts by weight of an acryl-melamine resin (trade name: Honey Bright C-IL; produced by Honey Chemical Co.), 11 to 13 parts by weight of fine nickel powder with an average particle diameter of 0.3 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated articles were washed with water and then heated in an oven of 120° C.±1° C. for 50 minutes to effect curing. Electro-deposition coated members were thus completed. The electro-deposition coating films formed thereon each had a coating thicknesses of 11 to 13 μm and the inorganic powder was contained in each coating film in a deposition quantity of 30 to 35% by weight.

The transfer guide and the fixing inlet guide each having the electro-deposition coating film thus formed had a volume resistivity of $10^7$ to $10^9$ Ω·cm, and no paper contamination due to adhesion of toner occurred even when they were set in a copying machine and copying was repeated 10,000 times in an environment of a low humidity (25% RH). No faulty operation such as blank areas in images also occurred even in an environment of a high humidity (85% RH). Thus these members showed good performance as paper delivery members.

This performance did not change throughout a durability test carried out by 150,000 sheet plain paper copying.

As for the coefficient of static friction, which is a value of physical properties that shows changes in wear resistance, a value as good as 1.4 to 1.6 was obtained after the durability test. In the meantime, the coefficient of static friction before the durability test was 1.8 to 1.9.

EXAMPLE 3-1

A test member was prepared in the same manner as in Example 1-1.

In 100 parts by weight of an acryl-melamine resin (trade name: Honey Bright C-IL; produced by Honey Chemical Co.), 10 parts by weight of aluminum oxide with an average particle diameter of 1 μm whose particle surfaces were coated with nickel by electroless plating in a thickness of 0.1 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 97° C.±1° C. for 60 minutes to effect curing. An electro-deposition coated member was thus completed. The electro-deposition coating film formed thereon had a coating thicknesses of 10 to 12 μm and the inorganic powder was contained in the coating film in a deposition quantity of 20 to 25% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 1.9 to 2.0.

EXAMPLE 3-2

On a transfer guide formed of an ABS resin, electro-deposition coating film was formed using an electro-deposition coating composition prepared by dispersing in 100 parts by weight of an acryl-melamine resin (trade name: Honey Bright C-IL; produced by Honey Chemical Co.) 8 parts by weight of $Al_2O_3$ with an average particle diameter of 1 μm whose particle surfaces were coated with nickel by electroless plating in a thickness of 0.1 μm. The electro-deposition was carried out at applied voltages of 100 V to 150 V and, in respect of other conditions, under the same conditions as in Example 3-1. The electro-deposition coating film thus formed had a coating thicknesses of 10 to 12 μm and the inorganic powder was contained in the coating film in a deposition quantity of 20 to 25% by weight.

The transfer guide having the electro-deposition coating film thus formed had a volume resistivity of $10^7$ to $10^9$ Ω·cm, and no paper contamination due to adhesion of toner occurred even when the transfer guide was set in a copying machine and copying was repeated 10,000 times in an environment of a low humidity (25%

RH). No faulty operation such as blank areas in images also occurred even in an environment of a high humidity (85% RH). Thus the transfer guide showed a good performance as a paper delivery member.

This performance did not change throughout a durability test carried out by 150,000 sheet plain paper copying.

As for the coefficient of static friction, which is a value of physical properties that shows changes in wear resistance, a value as good as 1.4 to 1.6 was obtained after the durability test. In the meantime, the coefficient of static friction before the durability test was 1.8 to 1.9.

EXAMPLE 3-3

A free-cutting leaded steel SLSUM was worked into a roller member of 30 mm in outer diameter and 230 mm in length to give an article to be coated. This roller member was degreased at 60° C. for 5 minutes using a commonly known alkali type degreaser. Next, after thorough washing with water, an iron-phosphate chemical conversion coating was formed in a thickness of 3 μm, followed by thorough washing with pure water and then dewatering and drying to give a test member.

In 100 parts by weight of an acryl-melamine resin (trade name: Honey Bright C-IL; produced by Honey Chemical Co.), 9 parts by weight of aluminum oxide powder with an average particle diameter of 1 μm whose particle surfaces were coated with nickel by electroless plating in a thickness of 0.1 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 110° C.±1° C. for 60 minutes to effect curing. An electro-deposition coated member was thus completed. The electro-deposition coating film formed thereon had a coating thicknesses of 11 to 13 μm and the inorganic powder was contained in the coating film in a deposition quantity of 20 to 25% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 2.0.

EXAMPLE 3-4

An aluminum 53S was worked into a roller member of 30 mm in outer diameter and 230 mm in length to give an article to be coated. On this aluminum roller member, an anodized aluminum coating was formed by anodizing to give a test member.

In 100 parts by weight of an acryl-melamine resin (trade name: Honey Bright C-IL; produced by Honey Chemical Co.), 15 parts by weight of aluminum oxide powder with an average particle diameter of 0.7 μm whose particle surfaces were coated with nickel by electroless plating in a thickness of 0.1 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 60 minutes to effect curing. An electro-deposition coated member was thus completed. The electro-deposition coating film formed thereon had a coating thicknesses of 10 to 12 μm and the inorganic powder was contained in the coating film in a deposition quantity of 25 to 30% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was to 2.0.

EXAMPLE 3-5

An Spcc-D material (a steel sheet of t=0.5 mm) was worked into a transfer guide and a fixing inlet guide, which were used as articles to be coated. A pretreatment before electro-deposition coating was carried out in the same manner as in Example 3-3.

In 100 parts by weight of an acryl-melamine resin (trade name: Honey Bright C-IL: produced by Honey Chemical Co.), 8 parts by weight of aluminum oxide powder with an average particle diameter of 1 μm whose particle surfaces were coated with nickel by electroless plating in a thickness of 0.1 μm was dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated articles were washed with water and then heated in an oven of 120° C.±1° C. for 50 minutes to effect curing. Electro-deposition coated members were thus completed. The electro-deposition coating films formed thereon each had a coating thicknesses of 11 to 13 μm and the inorganic powder was contained in each coating film in a deposition quantity of 25 to 30% by weight.

The transfer guide and the fixing inlet guide each having the electro-deposition coating film thus formed had a volume resistivity of $10^7$ to $10^9$ Ω·cm, and no paper contamination due to adhesion of toner occurred even when they were set in a copying machine and copying was repeated 10,000 times in an environment of a low humidity (25% RH). No faulty operation such as blank areas in images also occurred even in an environment of a high humidity (85% RH). Thus these members showed good performance as paper delivery members.

This performance did not change throughout a durability test carried out by 150,000 sheet plain paper copying.

As for the coefficient of static friction, which is a value of physical properties that shows changes in wear resistance, a value as good as 1.4 to 1.5 was obtained after the durability test. In the meantime, the coefficient of static friction before the durability test was 1.9.

EXAMPLE 4-1

A test member was prepared in the same manner as in Example 1-1.

In 100 parts by weight of an acryl-melamine resin (trade name: Honey Bright C-IL; produced by Honey Chemical Co.), 8 parts by weight of aluminum oxide with an average particle diameter of 1 μm whose particle surfaces were coated with nickel by electroless plating in a thickness of 0.1 μm and 8 parts by weight of cobalt (Co) powder with an average particle diameter of 0.3 μm were dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 97° C.±1° C. for 60 minutes to effect curing. An electro-deposition coated member was thus completed. The electro-deposition coating film formed thereon had a coating thicknesses of 10 to 12 μm and the inorganic powder was contained in the coating film in a deposition quantity of 35 to 40% by weight.

The wear resistance of the electro-deposition coating film thus formed was tested to obtain a good result that the coefficient of static friction of the roller was 1.4 to 1.6 even after a durability test to pass 150,000 sheets of copying plain paper. In the meantime, the coefficient of static friction before the durability test was 1.8 to 1.9.

EXAMPLE 4-2

On a transfer guide formed of an ABS resin, electro-deposition coating film was formed using an electro-deposition coating composition prepared by dispersing in 100 parts by weight of an acryl-melamine resin (trade name: Honey Bright C-IL; produced by Honey Chemical Co.) 4 parts by weight of $Al_2O_3$ with an average particle diameter of 1 μm whose particle surfaces were coated with nickel by electroless plating in a thickness of 0.1 μm and 5 parts by weight of fine tungsten (W) powder with an average particle diameter of 0.3 μm. The electro-deposition was carried out at applied voltages of 100 V to 150 V and, in respect of other conditions, under the same conditions as in Example 4-1. The electro-deposition coating film thus formed had a coating thicknesses of 10 to 12 μm and the inorganic powder was contained in the coating film in a deposition quantity of 23 to 28% by weight.

The transfer guide having the electro-deposition coating film thus formed had a volume resistivity of $10^7$ to $10^9$ Ω·cm, and no paper contamination due to adhesion of toner occurred even when the transfer guide was set in a copying machine and copying was repeated 10,000 times in an environment of a low humidity (25% RH). No faulty operation such as blank areas in images also occurred even in an environment of a high humidity (85% RH). Thus the transfer guide showed a good performance as a paper delivery member.

This performance did not change throughout a durability test carried out by 150,000 sheet plain paper copying.

As for the coefficient of static friction, which is a value of physical properties that shows changes in wear resistance, a value as good as 1.4 to 1.6 was obtained after the durability test. In the meantime, the coefficient of static friction before the durability test was 1.8 to 1.9.

EXAMPLE 4-3

A free-cutting leaded steel SLSUM was worked into a roller member of 30 mm in outer diameter and 230 mm in length to give an article to be coated. This roller member was degreased at 60° C. for 5 minutes using a commonly known alkali type degreaser. Next, after thorough washing with water, an iron-phosphate chemical conversion coating was formed in a thickness of 3 μm, followed by thorough washing with pure water and then dewatering and drying to give a test member.

In 100 parts by weight of an acryl-melamine resin (trade name: Honey Bright C-IL; produced by Honey Chemical Co.), 9 parts by weigh of aluminum oxide powder with an average particle diameter of 1 μm whose particle surfaces were coated with nickel by electroless plating in a thickness of 0.1 μm and 4 parts by weight of titanium (Ti) powder with an average particle diameter of 0.3 μm were dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 12 to 14 μm and the inorganic powder was contained in the coating film in a deposition quantity of 24 to 28% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was 1.9 to 2.0.

EXAMPLE 4-4

An aluminum 53S was worked into a roller member of 30 mm in outer diameter and 230 mm in length to give an article to be coated. On this aluminum roller member, an anodic oxidation coating was formed by anodizing to give a test member.

In 100 parts by weight of an acryl-melamine resin (trade name: Honey Bright C-IL; produced by Honey Chemical Co.), 4 parts by weight of aluminum oxide powder with an average particle diameter of 1 μm whose particle surfaces were coated with copper by electroless plating in a thickness of 0.1 μm and 12 parts by weight of cobalt (Co) powder with an average particle diameter of 0.3 μm were dispersed for 30 hours using a ball mill, and then the dispersion was diluted with desalted water to 15% by weight of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated article was washed with water and then heated in an oven of 120° C.±1° C. for 50 minutes to effect curing. An electro-deposition coated member was thus completed. The electro-deposition coating film formed thereon had a coating thicknesses of 10 to 12 μm and the inorganic powder was contained in the coating film in a deposition quantity of 33 to 38% by weight.

The wear resistance of the electro-deposition coating film thus formed was tested to obtain a good result that the coefficient of static friction of the roller was 1.5 to 1.6 even after a durability test to pass 150,000 sheets of copying plain paper. In the meantime, the coefficient of static friction before the durability test was to 1.9 to 2.0.

EXAMPLE 4-5

An Spcc-D material (a steel sheet of t=0.5 mm) was worked into a transfer guide and a fixing inlet guide, which were used as articles to be coated. A pretreatment before electro-deposition coating was carried out in the same manner as in Example 4-3.

In 100 parts by weight of an acryl-melamine resin (trade name: Honey Bright C-IL; produced by Honey Chemical Co.), 3 parts by weight of aluminum oxide powder with an average particle diameter of 1 μm whose particle surfaces were coated with nickel by electroless plating in a thickness of 0.1 μm and 7 parts by weight of silver powder with an average particle diameter of 0.3 μm were dispersed for 30 hours using a ball mill, and then the dispersion was diluted with desalted water to 15% by weight as a concentration of solid contents to make up a coating composition.

Using this coating composition, electro-deposition was carried out for 3 minutes at applied voltages ranging from 100 V to 150 V, under conditions of a bath temperature of 25° C. and pH 8 to 9, setting the article to be coated as the anode and a 0.5t stainless steel plate as the opposing electrode.

After the electro-deposition, the coated articles were washed with water and then heated in an oven of 120° C.±1° C. for 50 minutes to effect curing. Electro-deposition coated members were thus completed. The electro-deposition coating films formed thereon each had a coating thicknesses of 11 to 13 μm and the inorganic powder was contained in each coating film in a deposition quantity of 26 to 32% by weight.

The transfer guide and the fixing inlet guide each having the electro-deposition coating film thus formed had a volume resistivity of $10^7$ to $10^9$ Ω·cm, and no paper contamination due to adhesion of toner occurred even when they were set in a copying machine and copying was repeated 10,000 times in an environment of a low humidity (25% RH). No faulty operation such as blank areas in images also occurred even in an environment of a high humidity (85% RH). Thus these members showed good performance as paper delivery members.

This performance did not change throughout a durability test carried out by 150,000 sheet plain paper copying.

As for the coefficient of static friction, which is a value of physical properties that shows changes in wear resistance, a value as good as 1.4 to 1.5 was obtained after the durability test. In the meantime, the coefficient of static friction before the durability test was 1.8 to 1.9.

We claim:

1. A sheet feeding member comprising:
a substrate of the sheet feeding member; and
an electro-deposition coating film containing inorganic powder provided on said substrate, said coating film being formed by electrophoresis of resin and said inorganic powder being co-deposited onto said substrate with the resin.

2. A sheet feeding member according to claim 1, wherein said inorganic powder is selected from the group consisting of a ceramic powder, a metal powder, and a ceramic powder whose particle surfaces are coated with a metal.

3. A sheet feeding member according to claim 1, wherein said inorganic powder comprises a metal powder and a ceramic powder whose particle surfaces are coated with a metal.

4. A sheet feeding member according to claim 2, wherein said ceramic powder and said ceramic powder whose particle surfaces are coated with a metal, each have a particle diameter of from 0.1 μm to 3.0 μm.

5. A sheet feeding member according to claim 2, wherein said metal powder has a particle diameter of from 0.01 m to 3.0 μm.

6. A sheet feeding member according to claim 1, wherein said substrate is selected from the group consisting of a metallic member and a plastic member.

7. A delivery member according to claim 1, wherein said electro-deposition coating film has a coating thickness of not less than 5 μm.

8. A sheet feeding member according to claim 7, wherein the coating thickness is 7 to 15 μm.

* * * * *

UNITED STATES PATENT AND TRADEMARK OFFICE
CERTIFICATE OF CORRECTION

PATENT NO. : 5,283,116

DATED : February 1, 1994

INVENTOR(S) : YOSHIAKI TOMARI, ET AL

It is certified that error appears in the above-indentified patent and that said Letters Patent is hereby corrected as shown below:

On the title page: Item [56] Reference Cited, line USPD, "Olivia" should read --Oliva --; and
Line USPD, "Fernando" should read --Ferrando --.

Column 1, line 50, "plated." should read --plated, --.

Column 3, line 37, "invention" should read --invention. --.

Column 9, line 31, "Obtain" should read --obtain --.

Column 14, line 23, "ties" should ead --times --.

Column 16, line 2, "Thus" should read --Thus, --.

Column 18, line 60, "Thus" should read --Thus, --;

Column 22, line 9, "Thus" should read --Thus, --;
line 43, "0.01m" should read --0.01 --; and
line 47, "delivery member" should read --sheet feeding member --.

Figure 8, "POWDER METALLIZED" should read --POWDER + METALLIZED --.

Signed and Sealed this

Sixth Day of September, 1994

Attest:

BRUCE LEHMAN

*Attesting Officer* *Commissioner of Patents and Trademarks*